(12) United States Patent
Kakinuma et al.

(10) Patent No.: US 12,244,022 B2
(45) Date of Patent: Mar. 4, 2025

(54) SUPPORTED METAL CATALYST AND ELECTROCHEMICAL CELL

(71) Applicants: UNIVERSITY OF YAMANASHI, Kofu (JP); NIHON KAGAKU SANGYO CO., LTD., Tokyo (JP)

(72) Inventors: Katsuyoshi Kakinuma, Kofu (JP); Makoto Uchida, Kofu (JP); Akihiro Iiyama, Kofu (JP); Isao Amemiya, Tokyo (JP); Chisato Arata, Tokyo (JP); Sumitaka Watanabe, Tokyo (JP)

(73) Assignees: University of Yamanashi, Kofu (JP); Nihon Kagaku Sangyo Co., Ltd., Tokyo (JP)

( * ) Notice: Subject to any disclaimer, the term of this patent is extended or adjusted under 35 U.S.C. 154(b) by 401 days.

(21) Appl. No.: 17/782,964

(22) PCT Filed: Dec. 10, 2020

(86) PCT No.: PCT/JP2020/046057
§ 371 (c)(1),
(2) Date: Jun. 6, 2022

(87) PCT Pub. No.: WO2021/117812
PCT Pub. Date: Jun. 17, 2021

(65) Prior Publication Data
US 2023/0006219 A1    Jan. 5, 2023

(30) Foreign Application Priority Data

Dec. 13, 2019    (JP) ................... 2019-225491

(51) Int. Cl.
*B01J 21/06*    (2006.01)
*B01J 23/14*    (2006.01)
(Continued)

(52) U.S. Cl.
CPC ........... *H01M 4/925* (2013.01); *C25B 11/067* (2021.01)

(58) Field of Classification Search
CPC . B01J 21/063; B01J 23/14; B01J 23/42; B01J 23/626; H01M 4/925; C25B 11/067
(Continued)

(56) References Cited

U.S. PATENT DOCUMENTS 9,608,278 B2 *   3/2017   Hayden ................. H01M 4/925
9,837,668 B2 *   12/2017  Cerri ................... H01M 4/8657
(Continued)

FOREIGN PATENT DOCUMENTS

JP        4773860         9/2011
JP        5785790         3/2015
(Continued)

OTHER PUBLICATIONS

Indian Office Action as mailed on Jan. 25, 2023, issued in corresponding Indian Patent Application No. 202245049585, 6 pages.
(Continued)

*Primary Examiner* — Cam N. Nguyen
(74) *Attorney, Agent, or Firm* — Christensen O'Connor Johnson Kindness PLLC

(57) ABSTRACT

A support and metal catalyst with improved electric conductivity is provided. A support and metal catalyst, including: a support powder; and metal fine particles supported on the support powder; wherein: the support powder is an aggregate of support fine particles; the support fine particles have a chained portion structured by a plurality of crystallites being fusion bonded to form a chain; the support fine particles are structured with metal oxide; and the metal oxide is doped with a dopant element, and an atomic ratio of titanium with respect to total of titanium and tin is 0.30 to 0.80, is provided.

8 Claims, 13 Drawing Sheets

(51) Int. Cl.
*B01J 23/42* (2006.01)
*B01J 23/62* (2006.01)
*C25B 11/067* (2021.01)
*H01M 4/92* (2006.01)

(58) Field of Classification Search
USPC .................................................. 502/339, 350
See application file for complete search history.

(56) References Cited

U.S. PATENT DOCUMENTS

| | | | |
|---|---|---|---|
| 10,431,831 B2* | 10/2019 | Sakai | H01M 4/92 |
| 11,302,929 B2* | 4/2022 | Senoo | H01M 8/1039 |
| 2012/0295184 A1 | 11/2012 | Watanabe et al. | |
| 2015/0333338 A1 | 11/2015 | Hayden et al. | |
| 2017/0250409 A1 | 8/2017 | Kakinuma et al. | |
| 2018/0175397 A1 | 6/2018 | Shintani et al. | |
| 2020/0164349 A1 | 5/2020 | Kakinuma et al. | |

FOREIGN PATENT DOCUMENTS

| | | |
|---|---|---|
| JP | 2016-504191 A | 2/2016 |
| JP | 2019-111510 A | 7/2019 |
| WO | 2011/065471 A1 | 6/2011 |
| WO | 2016/203679 A1 | 12/2016 |
| WO | WO2018061412 | 5/2018 |
| WO | 2019021904 A1 | 1/2019 |

OTHER PUBLICATIONS

European Search Report for Application No. EP 20 89 9620, mailed Jul. 7, 2023, 10 pages.

International Search Report mailed Mar. 2, 2021, issued in corresponding International Patent Application No. PCT/JP2020/046057, filed Dec. 10, 2020, 3 pages.

Gao, Y., et al., "Preparation and Characterization of $Ti_{0.7}Sn_{0.3}O_2$ as Catalyst Support for Oxygen Reduction Reaction," Journal of Energy Chemistry 23(3):331-337, May 2014.

* cited by examiner

SUPPORTED METAL CATALYST AND ELECTROCHEMICAL CELL

FIELD OF THE INVENTION

The present invention relates to a support and metal catalyst and to an electrochemical cell. The support and metal catalyst of the present invention can be used, for example, as a catalyst for electrochemical reaction in an electrochemical cell. The electrochemical cell is intended to mean a cell which performs an electrochemical reaction. For example, a fuel cell which generates electricity by electrochemical reaction using fuel such as hydrogen and methanol, a hydrogen purification and pressure booster device which generates purified hydrogen gas with high pressure and high purity from hydrogen-containing gas by an electrochemical reaction, a redox flow battery which performs charge and discharge by redox reaction, and a water electrolysis cell which decompose water into hydrogen and oxygen by an electrochemical reaction, can be mentioned.

BACKGROUND OF THE INVENTION

Patent Literature 1 discloses a support and metal catalyst in which metal catalyst is supported on a support structured with titanium oxide doped with a different kind of metal. The support and metal catalyst are used as a catalyst layer of an anode of a fuel cell system.

PRIOR ART DOCUMENTS

Patent Literature

[Patent Literature 1] WO 2016/203679

SUMMARY OF INVENTION

Technical Problem

However, the internal resistance of the fuel cell system of Patent Literature 1 is not sufficiently low, and thus it is desired to improve electric conductivity of the support and metal catalyst.

The present invention has been made by taking these circumstances into consideration. The present invention provides a support and metal catalyst with improved electric conductivity.

Means to Solve the Problem

According to the present invention, a support and metal catalyst, comprising: a support powder; and metal fine particles supported on the support powder; wherein: the support powder is an aggregate of support fine particles; the support fine particles have a chained portion structured by a plurality of crystallites being fusion bonded to form a chain; the support fine particles are structured with metal oxide; and the metal oxide is doped with a dopant element, and an atomic ratio of titanium with respect to total of titanium and tin is 0.30 to 0.80, is provided.

The present inventors have conducted intensive research, and have found that when the atomic ratio of titanium with respect to the total of titanium and tin in the metal oxide constituting the support fine particles is 0.30 to 0.80, electric conductivity becomes particularly high, thereby leading to completion of the invention.

DESCRIPTION OF THE PREFERRED EMBODIMENTS

Figure 1:
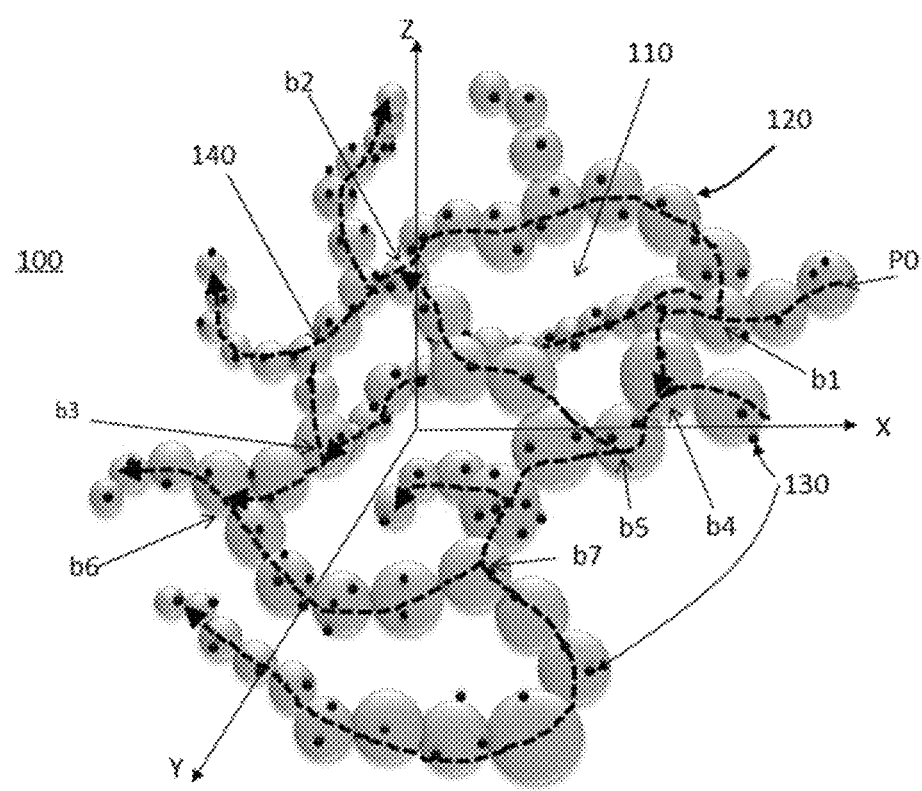
FIG. 1 shows a model diagram of a catalyst structure of support and metal catalyst 100.

Hereinafter, embodiments of the present invention will be explained with reference to the drawings. Various distinctive features shown in the following embodiments can be combined with each other. In addition, an invention can be established independently for each of the distinctive features.

1-1. Support and Metal Catalyst 100

As shown in FIGS. 1 to 4, the support and metal catalyst 100 comprises a support powder which is an aggregate of support fine particles 150 having a chained portion structured by fusion bonding a plurality of crystallites 120 into a chain, and metal fine particles 130 being supported on the support powder.

The electric conductivity of the support and metal catalyst 100 is preferably 0.02 S/cm or more, more preferably 0.03 S/cm or more. The electric conductivity is, for example, 0.02 to 1000 S/cm, and is particularly for example, 0.03, 0.04, 0.05, 0.06, 0.07, 0.08, 0.09, 0.1, 1, 10, 100, or 1000 S/cm, and can be in the range between the two values exemplified herein.

Hereinafter, each of the constituents will be explained.

1-1. Support Fine Particles 150 and Support Powder

As shown in FIG. 1, in the support fine particles 150, a three-dimensional void 110 surrounded by the branch 160 and pores existing between a plurality of branches is formed. Here, a plurality of crystallites 120 structuring the support fine particles 150 is fusion bonded to form a chained portion, thereby forming the branch 160. Gas diffusion route to diffuse and transfer oxygen as the oxidant and/or hydrogen as the fuel to the support and metal catalyst 100 is formed by the three-dimensional arrangement of the support fine particles 150 described above.

Figure 2:
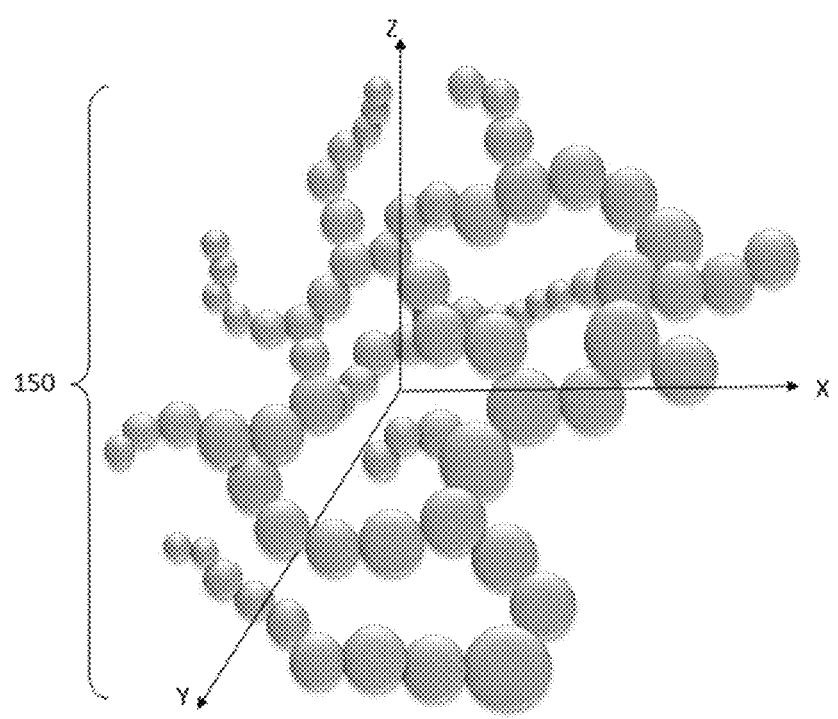
FIG. 2 shows a view in which support fine particles 150 are taken from FIG. 1.
Figure 3:
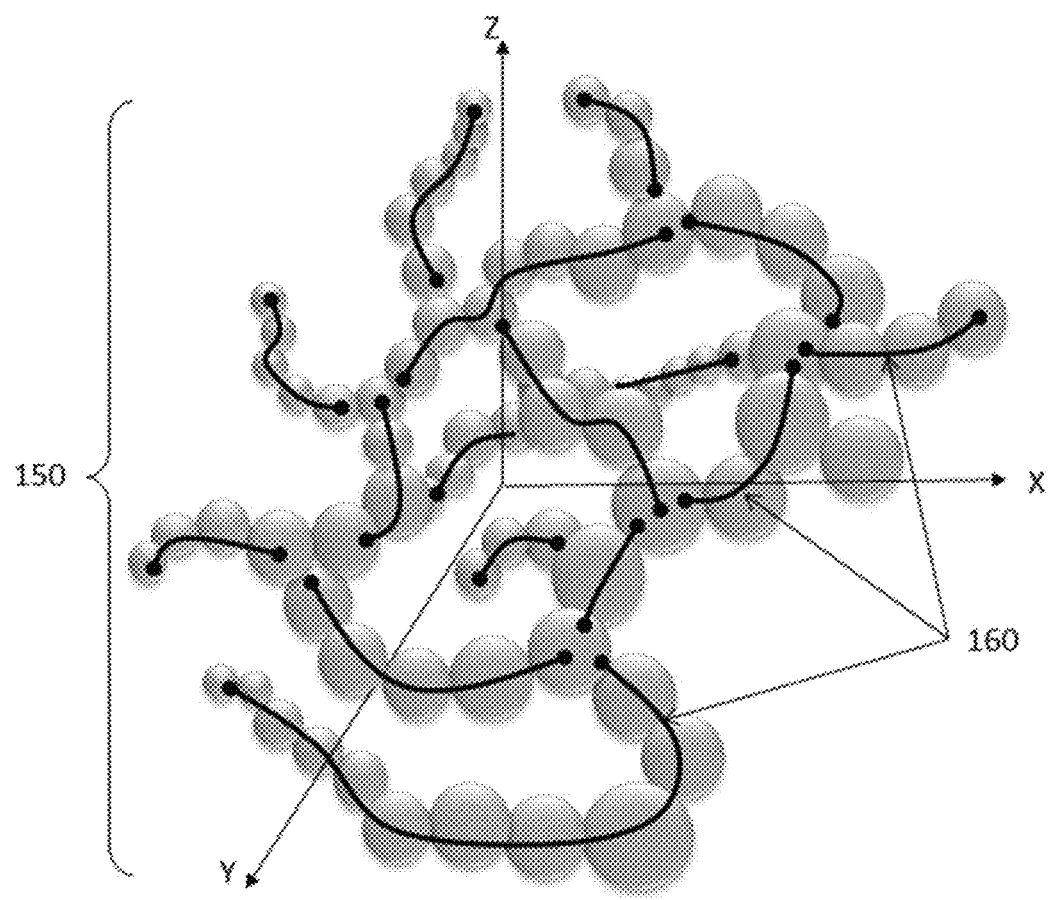
FIG. 3 shows a condition of branch 160 of the support fine particles 150 of FIG. 1.
Figure 4:
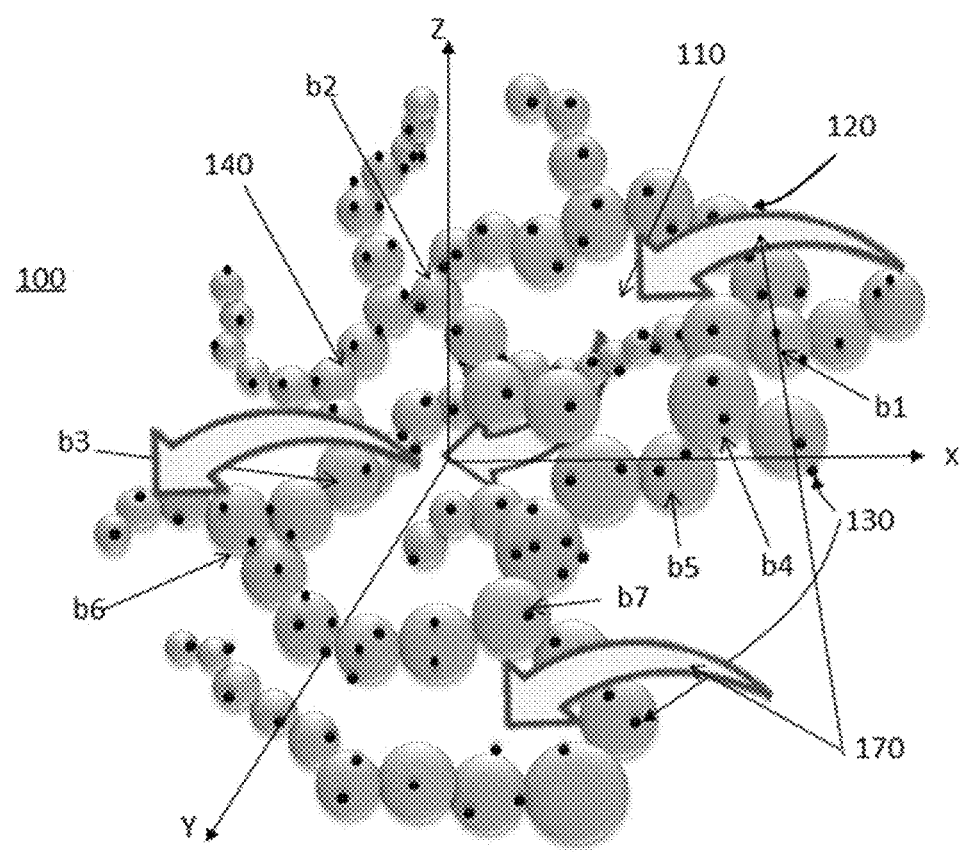
FIG. 4 shows a gas diffusion route of FIG. 1.

As shown in FIGS. 1 to 3 as an example of structure model of the support and metal catalyst, the support fine particles 150 comprise four pores of a first pore surrounded by points b1, b2, b5, b4, and b1, where the branches link with each other (may be referred to as branching points, or merely as branch); a second pore surrounded by branching points b1, b2, b3, and b1; a third pore surrounded by branching points b2, b3, b6, b7, b5, and b2; and a fourth pore surrounded by branching points b1, b3, b6, b7, b5, b4, and b1. Here, when a plane surrounded by the branching points of each of the pores (first to fourth pores) is taken as the pore plane, the void 110 is a three-dimensional space surrounded by the four pore planes. The support fine particles 150 comprise a plurality of pores surrounded by a plurality of branching points in which a plurality of branches link with each other. Further, the three-dimensional spaces (voids) which are surrounded by the plurality of pores are provided sequentially, thereby structuring the support fine particles. Accordingly, the void serves as the gas diffusion route (gas diffusion path) of oxygen, hydrogen and the like. FIG. 4 shows the gas diffusion route in FIG. 1. In FIG. 4, one example of the gas diffusion route (gas diffusion path) of void 110 is shown. Flow (gas diffusion route) 170 of oxidant (gas), fuel gas and the like can flow in the desired direction via the void 110 as shown in FIG. 4. That is, the void 110 serves as the gas diffusion route.

Here, as a simple structure of the support fine particles 150, the support fine particles can have only one pore (for example, the first pore surrounded by the branching points b1, b2, b5, b4, and b1). In such case, a void 110 having a thickness of the crystallite grain of the crystallite 120 is provided. As a simpler structure, the support fine particles 150 can have one or more branches. In such case, the branches within the support fine particles 150 prohibits cohesion of the support fine particles, thereby providing void 110 between the support fine particles.

Here, the "pore" mentioned above can also be mentioned as closed curve (closed loop). Otherwise, it can be said that a void 110 surrounded by a closed plane including the afore-mentioned plurality of branching points (for example, branching points b1 to b7) is provided. As the branching points b1 to b7, the center of gravity of the crystallite of the metal oxide structuring the support fine particles 150 in which the branches connect with each other can be taken as the branching point, or an arbitrary point in the crystallite can be taken as the branching point.

The support fine particles 150 have a branch 160 comprising a chained portion which is structured by fusion bonding a plurality of crystallites 120 into a chain. The branch 160 itself has a nature to allow electrons to flow. As shown in FIGS. 1 to 4, the support fine particles 150 have a plurality of branches 160, and the branches connect with each other at branching points (b1 to b7), by which a network is structured. Electrically conductive nature can be seen among these. Accordingly, the branches 160 of the support fine particles 150 shown by the dotted line from point P0 in FIG. 1 itself structures an electron conduction route (electron conduction path) 140.

The size of the crystallite 120 is preferably 1 to 100 nm, more preferably 5 to 40 nm. The size is, particularly for example, 1, 5, 10, 15, 20, 25, 30, 35, 40, 50, or 100 nm, and can be in the range between the two values exemplified herein. The size of the crystallite 120 (crystallite diameter) can be obtained in accordance with a Sheller formula using half-width in the XRD pattern peak.

The aggregate of the support fine particles 150 is in the form of a powder. Such aggregate is referred to as "support powder".

The mean particle size of the support fine particles 150 in the support powder is in the range of 0.1 μm to 4 μm, preferably in the range of 0.5 μm to 2 μm. The mean particle size of the support fine particles 150 can be measured with a laser diffraction/scattering particle size distribution analyzer.

The specific surface area of the support powder is preferably 12 m$^2$/g or more, and is more preferably 25 m$^2$/g or more. The specific surface area is, for example, 12 to 100 m$^2$/g, particularly for example, 12, 15, 20, 25, 30, 35, 40, 45, 50, 60, 70, 80, 90, or 100 m$^2$/g, and can be in the range between the two values exemplified herein.

Figure 5:
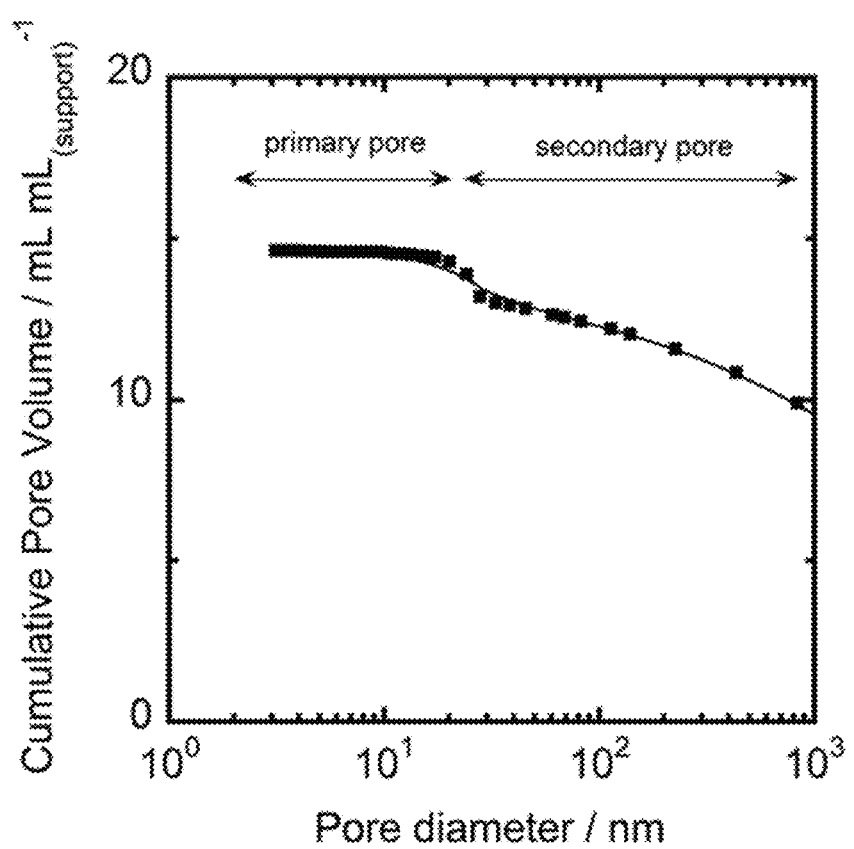
FIG. 5 shows one example of the distribution of void 110 contained in the support powder.

One example of the distribution of the void 110 contained in the support powder is shown in FIG. 5. The distribution of the void 110 can be obtained by measuring the volume of the three-dimensional void of the support powder by using a mercury porosimetry. In FIG. 5, volume per one void is obtained from the number of voids and the measured volume value, and then a cumulative size distribution is shown as a value of a diameter of a sphere, the sphere being obtained by converting the obtained volume to sphere (sphere equivalent diameter by mercury injection method). As shown in FIG. 5, void of 11 nm or smaller (primary pore) and void of larger than 11 nm (secondary pore) preferably exist in the support powder. Accordingly, gas diffusion route is secured.

The support powder preferably has a void fraction of 50% or higher, more preferably 60% or higher. The void fraction is, for example, 50 to 80%, particularly for example, 50, 55, 60, 65, 70, 75, or 80%, and can be in the range between the two values exemplified herein. The void fraction can be obtained as the ratio of the bulk density of the support powder molded with a uniaxial pressure molding machine (molded body size: 5 mm×5 mm×30 mm, molding pressure: 2 MPa or less) to the true density of the support powder, mercury press-in method, or FIB-SEM.

The support powder preferably has a repose angle of 50 degrees or less, and more preferably a repose angle of 45 degrees or less. In such case, the support powder has a similar flowability as flour, and thus handling is simple. The repose angle is, for example, 20 to 50 degrees, particularly for example, 20, 25, 30, 35, 40, 45, or 50, and can be in the range between the two values exemplified herein. The repose angle can be obtained by drop volume method.

The support fine particles 150 are structured with metal oxide. The metal oxide is doped with dopant element. The dopant element is an element having a different valence than titanium and tin. As the dopant element, at least one is selected among rare earth elements such as yttrium, Group 5 elements such as niobium and tantalum, Group 6 elements such as tungsten, and Group 15 elements such as antimony. When doping is performed with such elements, support fine particles can be imparted with conductivity. Among such elements, Group 5 elements represented by niobium and tantalum, or Group 6 elements represented by tungsten are preferred, and tantalum, niobium, antimony or tungsten are particularly preferred. Tantalum or tungsten are particularly preferred due to their large solid solution capacity.

The atom ratio of the dopant element with respect to the entire metal contained in the metal oxide is preferably 0.05 to 0.30. In such case, the electric conductivity of the support and metal catalyst 100 becomes particularly high. The atom ratio is, particularly for example, 0.05, 0.10, 0.15, 0.20, 0.25, or 0.30, and can be in the range between the two values exemplified herein.

The metal oxide is preferably a complex oxide of titanium and tin, and the atomic ratio of titanium with respect to the total of titanium and tin is preferably 0.30 to 0.80, more preferably 0.40 to 0.80. In such case, the electric conductivity of the support and metal catalyst 100 becomes high. The atom ratio is, particularly for example, 0.30, 0.35, 0.40, 0.45, 0.50, 0.55, 0.60, 0.65, 0.70, 0.75, or 0.80, and can be in the range between the two values exemplified herein.

1-2. Metal Fine Particles 130

Figure 6:
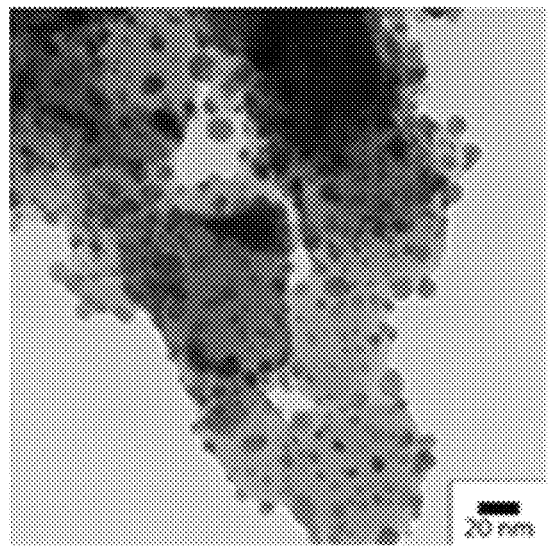
FIG. 6 shows one example of TEM image of the support and metal catalyst 100.

The metal fine particles 130 are fine particles of metal or metal alloy which can serve as a catalyst. The metal fine particles 130 preferably contain platinum, and the metal fine particles 130 are more preferably platinum. The mean particle size of the plurality of metal fine particles 130 supported on the support powder is 3 to 10 nm. The mean particle size is, particularly for example, 1, 2, 3, 4, 5, 6, 7, 8, 9, 10, 11, 12, 13, 14, 15, 16, 17, 18, 19, or 20 nm, and can be in the range between the two values exemplified herein. When the mean particle size of the metal fine particles 130 is smaller than 3 nm, the metal fine particles would dissolve along with the progress of the electrode reaction. On the other hand, when the mean particle size is larger than 10 nm, the electrochemical active area would become small, and thus the desired electrode performance cannot be achieved. The metal fine particles 130 are, among the particles shown in the transmission image of support and metal catalyst 100 obtained by TEM in FIG. 6, particles that are dispersed on the surface of the crystallites (120) having a crystallite size of 1 to 100 nm and having higher contrast than the crystallites. The size of such metal fine particles can be obtained by measuring the diameter of the circumscribed circle of all of the imaged metal fine particles 130, and calculating their arithmetic mean.

The metal fine particles 130 preferably comprise a core and a skin layer covering the core. The core preferably comprises an alloy of a noble metal and a transition metal. The skin layer preferably comprises a noble metal. As the noble metal, platinum is preferable. As the transition metal, cobalt (Co) or nickel (Ni) are preferable, and cobalt is especially suitable.

Preferably, titanium is contained in the metal fine particles 130 in a solid solution state. Preferably, titanium is contained as a solid solution more in the core than the skin layer. Accordingly, when titanium is contained as a solid solution more in the core, activity of the core can be improved.

The amount of the metal fine particles 130 being supported is preferably 1 to 50 mass %, more preferably 5 to 25 mass %. The amount being supported is, particularly for example, 1, 5, 10, 15, 20, 25, 30, 35, 40, 45, or 50 mass %, and can be in the range between the two values exemplified herein.

The electrochemical active surface area of the support and metal catalyst 100 is preferably 20 $m^2/g$ or more. This surface area is, for example, 20 to 200 $m^2/g$, and is particularly for example, 20, 30, 40, 50, 60, 70, 80, 90, 100, 110, 120, 130, 140, 150, 160, 170, 180, 190, or 200 $m^2/g$, and can be in the range between the two values exemplified herein. The electrochemical active surface area can be obtained by the rotating ring disk electrode method or cyclic voltammetry (sweep rate of 0.1 V/sec. or less) of membrane electrode assembly.

2. Fuel Cell 200

Figure 7:
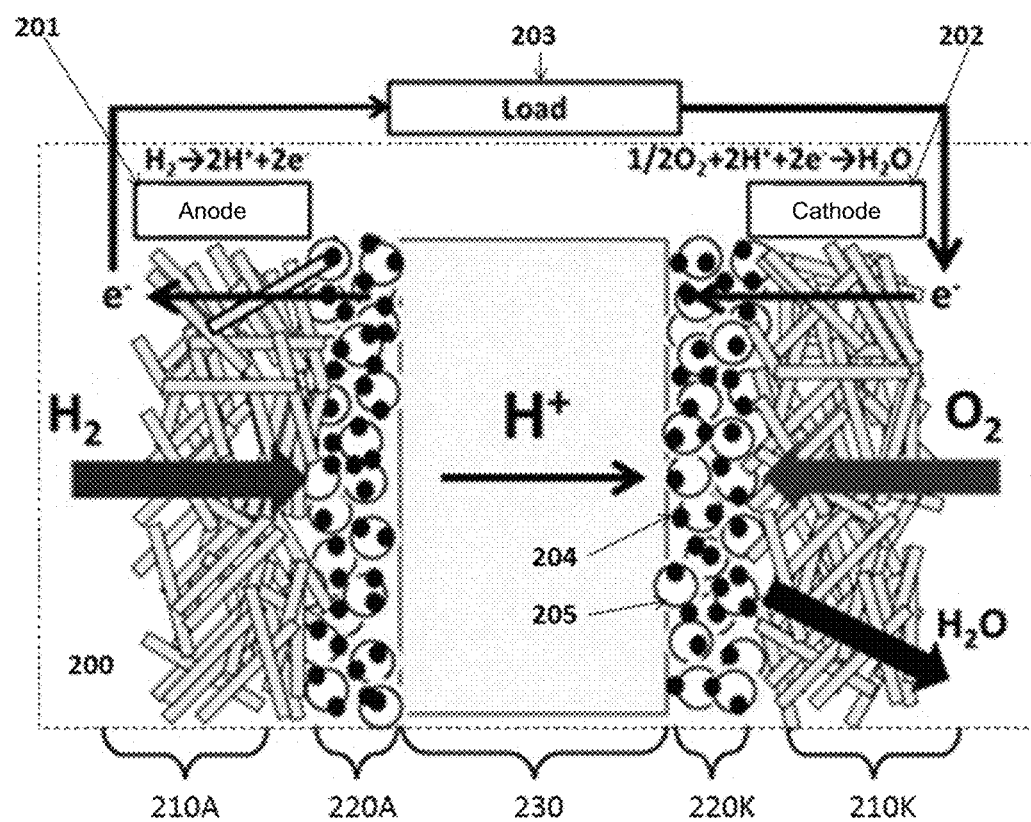
FIG. 7 shows a model diagram of a fuel cell system.
Figure 8:
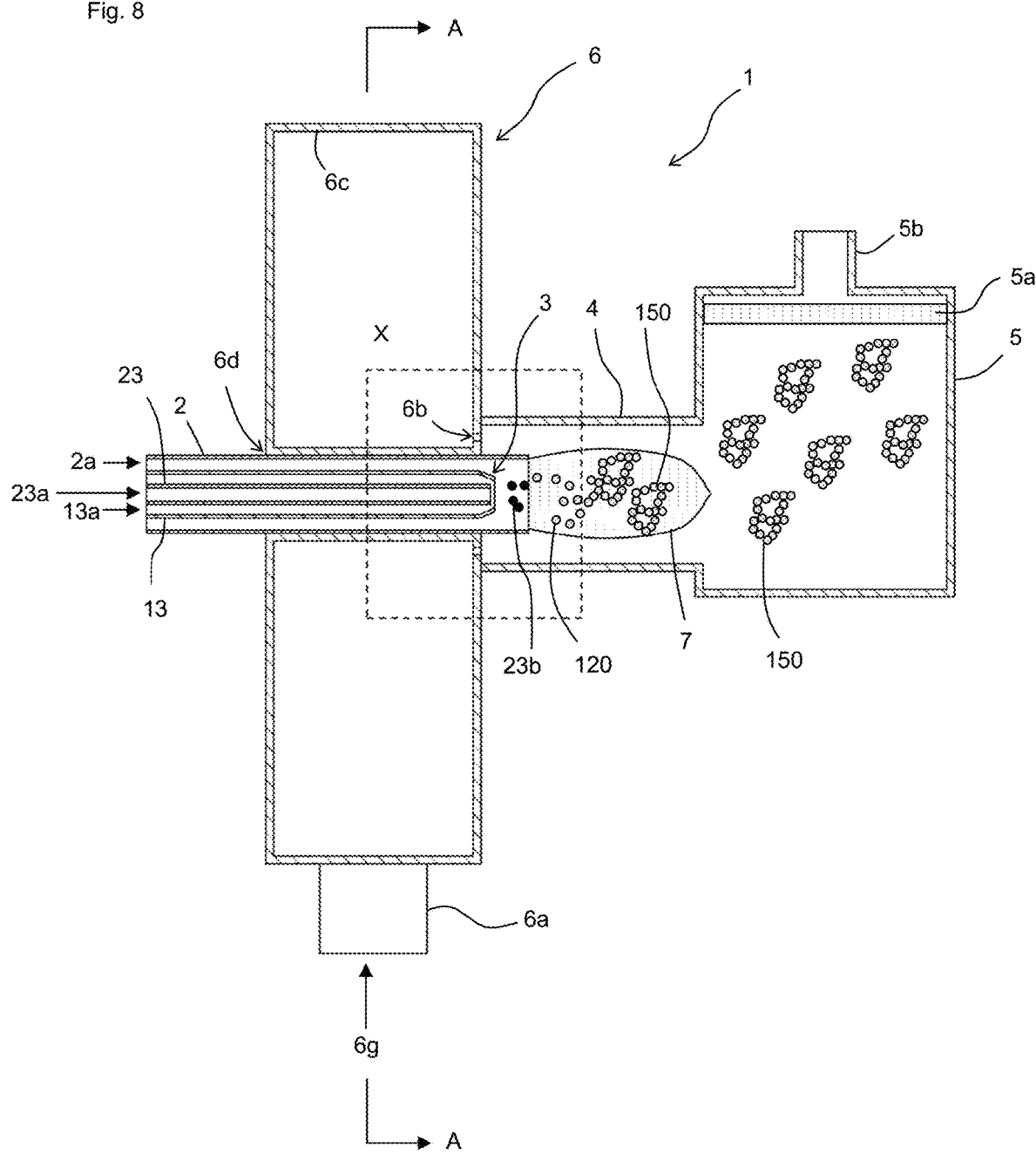
FIG. 8 shows a sectional view which is cut through the center of burner 2 of a manufacturing apparatus 1 for manufacturing the support powder.
Figure 9:
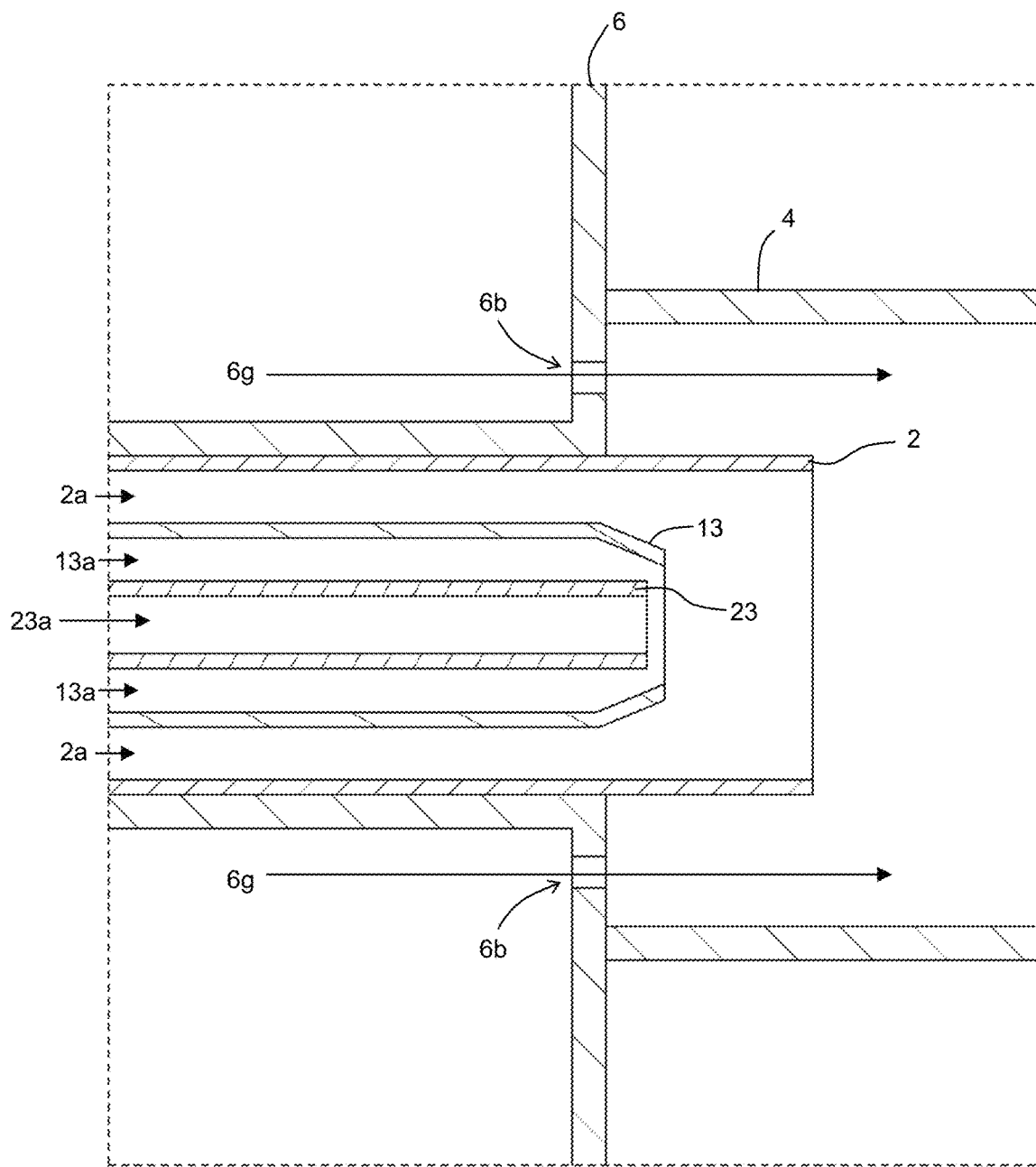
FIG. 9 shows an enlarged view of region X in FIG. 8.
Figure 10:
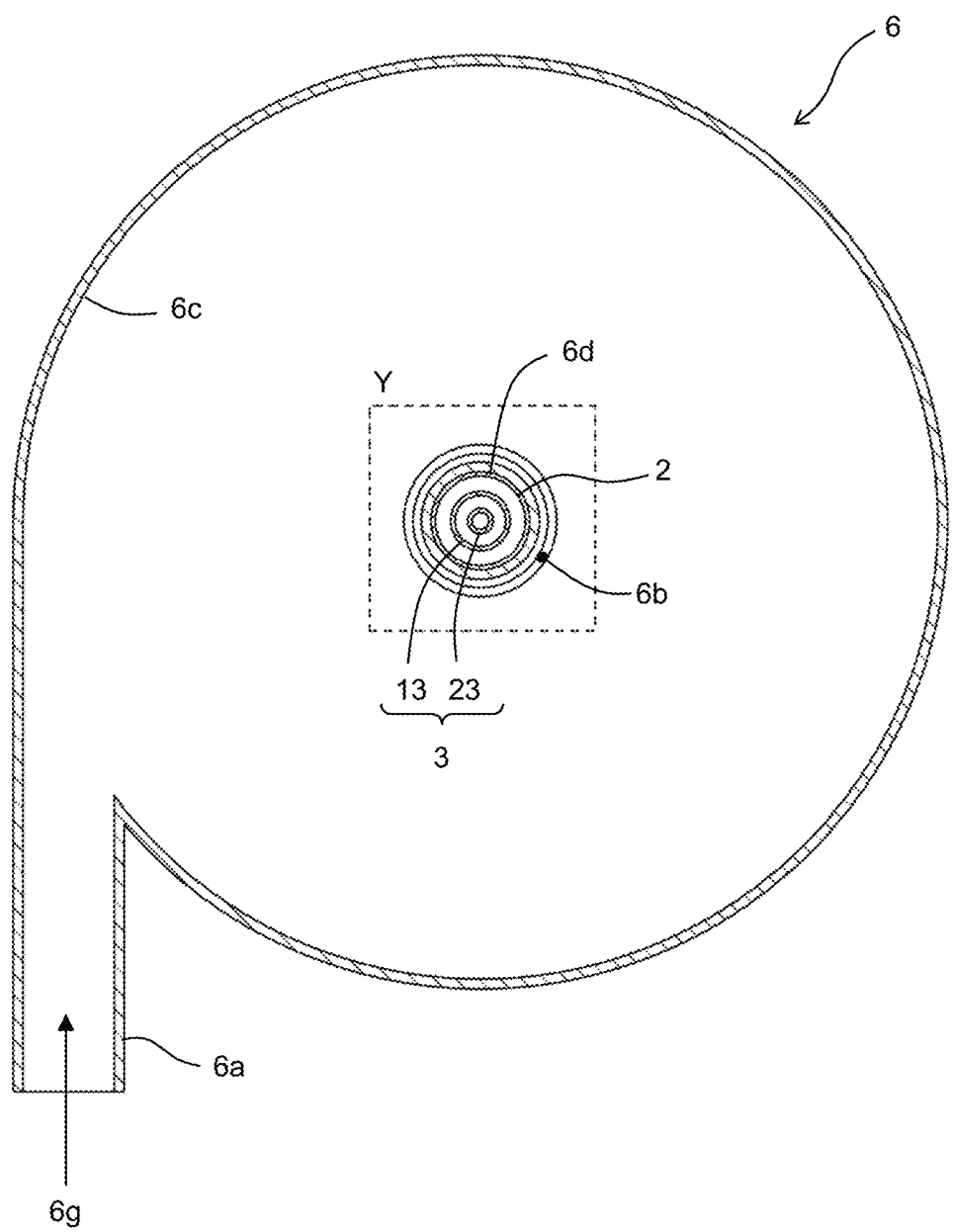
FIG. 10 shows a sectional view taken along the line A-A of FIG. 8.
Figure 11:
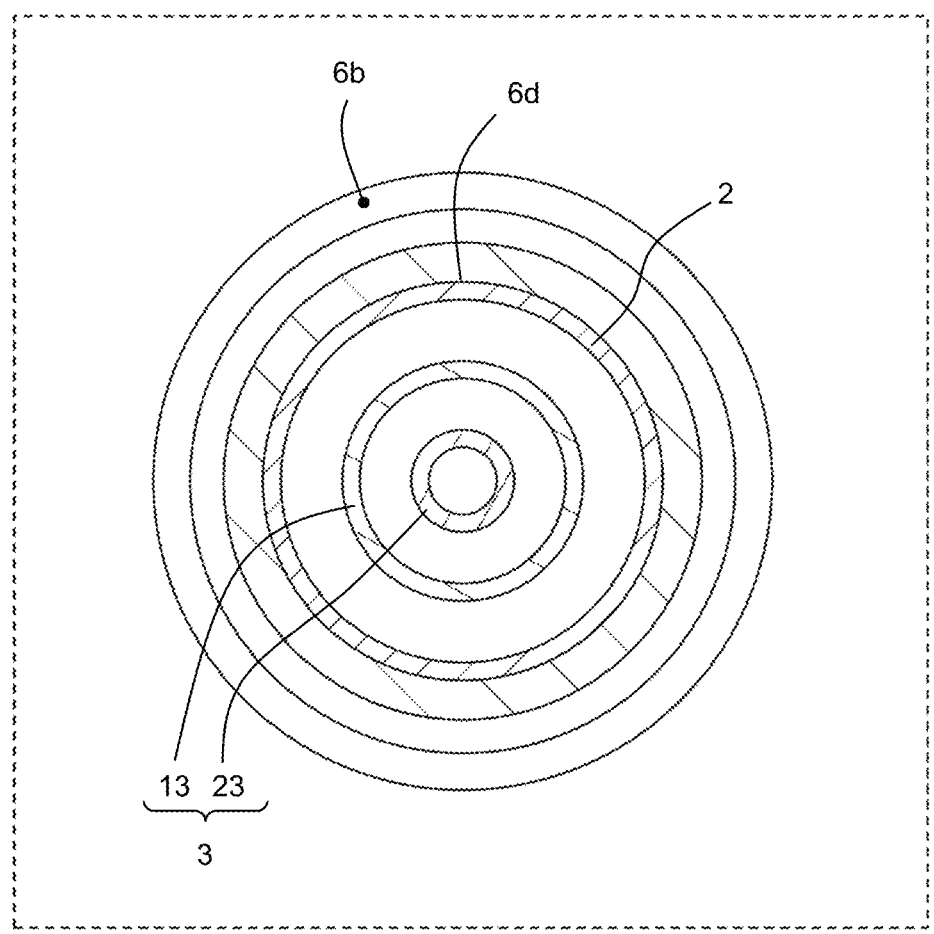
FIG. 11 shows an enlarged view of region Y in FIG. 10.

A model diagram of the fuel cell according to the present invention is shown in FIG. 7. In FIG. 7, the fuel cell 200 is structured by aligning the catalyst layer 220A and the gas diffusion layer 210A on the anode 201 side, and the catalyst layer 220K and the gas diffusion layer 210K on the cathode 202 side, facing each other with the electrolyte membrane 230 in between. That is, the gas diffusion layer 210A on the anode side, the catalyst layer 220A on the anode side, the electrolyte membrane 230, the catalyst layer 220K on the cathode side, and the gas diffusion layer 210K on the cathode side are aligned in this order. By connecting the load 203 in between the anode 201 and the cathode 202 of the fuel cell 200, power is output to the load 203.

Preferably, at least one of the catalyst layer 220A on the anode side and the catalyst layer 220K on the cathode side is formed with the support and metal catalyst 100. More preferably, the catalyst layer 220A on the anode side is formed with the support and metal catalyst 100. The electric resistance of the support and metal catalyst 100 is larger under oxygen atmosphere than under hydrogen atmosphere. Therefore, when the support and metal catalyst 100 is used for the catalyst layer 220A on the anode side, occurrence of oxygen reduction reaction at the catalyst layer 220A on the anode side is suppressed when the fuel cell is started or shutdown. Therefore, corrosion reaction of the catalyst layer 220K on the cathode side is suppressed even when the support thereof is carbon. Accordingly, degradation of power generation performance of the fuel cell is suppressed.

As the catalyst other than the support and metal catalyst 100, catalysts disclosed in Patent Literature 1, catalysts structured by supporting metal fine particles on support of ceramics (for example, tin oxide, titanium oxide) other than the metal oxide of the present invention, and catalysts structured by supporting metal fine particles on carbon support, can be mentioned.

3. Method for Manufacturing Support Powder

First, referring to FIG. 8 to FIG. 11, the manufacturing apparatus 1 which can be used for the manufacture of the support powder is explained. The manufacturing apparatus 1 comprises a burner 2, a raw material supplying unit 3, a reaction cylinder 4, a collector 5, and a gas reservoir 6. The raw material supplying unit 3 comprises an outer cylinder 13, and a raw material distribution cylinder 23.

The burner 2 is a cylinder, and the raw material supplying unit 3 is arranged in the burner 2. Burner gas 2a is distributed between the burner 2 and the outer cylinder 13. The burner gas 2a is used to form a flame 7 at the tip of the burner 2 by ignition. A high temperature region having a temperature of 1000° C. or higher is formed by the flame 7. The burner gas 2a preferably contains a combustible gas such as propane, methane, acetylene, hydrogen, or nitrous oxide. In one example, a gas mixture of oxygen and propane can be used as the burner gas 2a. The temperature of the high temperature region is 1000 to 2000° C. for example, and is particularly for example, 1000, 1100, 1200, 1300, 1400, 1500, 1600, 1700, 1800, 1900, or 2000° C., and can be in the range between the two values exemplified herein.

A raw material solution 23a for generating the support powder is distributed in the raw material distribution cylinder 23. As the raw material solution 23a, the one containing a titanium compound and tin compound is used. As the titanium compound and tin compound, fatty acid titanium and fatty acid tin can be mentioned for example. The number of carbon atoms in the fatty acid is, for example, 2 to 20, preferably 4 to 15, and further preferably 6 to 12. As the fatty acid, octylic acid is preferable.

The raw material solution 23a can contain metal compound for doping the support fine particles 150. As the metal compound, fatty acid metal (Nb, Ta, W and the like) salt can be mentioned for example. The number of carbon atoms in the fatty acid is, for example, 2 to 20, preferably 4 to 15, and further preferably 6 to 12. As the fatty acid metal salt, niobium octylate, tantalum octylate, antimony octylate, and tungsten octylate are preferable.

In the raw material solution 23a, the titanium compound and the tin compound are preferably dissolved or dispersed in a non-aqueous solvent. As the non-aqueous solvent, organic solvent represented by terpen can be mentioned. If moisture is contained in the raw material solution 23a, fatty acid titanium and fatty acid tin can undergo hydrolysis and degrade.

Mist gas 13a used for converting the raw material solution 23a into a mist is distributed in between the outer cylinder 13 and the raw material distribution cylinder 23. When the mist gas 13a and the raw material solution 23a are jetted together from the tip of the raw material supplying unit 3, the raw material solution 23a is converted into a mist. The mist 23b of the raw material solution 23a is sprayed into the flame 7, and the titanium compound and the tin compound in the raw material solution 23a undergoes a thermal decomposition reaction in the flame 7. Accordingly, support powder which is an aggregate of support fine particles 150 having a chained portion structured by fusion bonding the crystallite 120 into a chain is generated. The mist gas 13a is oxygen in one example.

The reaction cylinder 4 is provided between the collector 5 and the gas reservoir 6. The flame 7 is formed in the reaction cylinder 4. The collector 5 is provided with a filter 5a and a gas discharging portion 5b. A negative pressure is applied to the gas discharging portion 5b. Accordingly, a flow which flows towards the gas discharging portion 5b is generated in the collector 5 and the reaction cylinder 4.

The gas reservoir 6 has a cylinder shape, and comprises a cold gas introducing portion 6a and a slit 6b. A cold gas 6g is introduced from the cold gas introducing portion 6a into the gas reservoir 6. The cold gas introducing portion 6a is directed in a direction along the tangential line of the inner peripheral wall 6c of the gas reservoir 6. Therefore, the cold gas 6g introduced through the cold gas introducing portion 6a into the gas reservoir 6 revolves along the inner peripheral wall 6c. At the center of the gas reservoir 6, a burner insertion hole 6d is provided. The burner 2 is inserted through the burner insertion hole 6d. The slit 6b is provided in the vicinity of the burner insertion hole 6d so as to surround the burner insertion hole 6d. Accordingly, when the burner 2 is inserted through the burner insertion hole 6d, the slit 6b is provided so as to surround the burner 2. The cold gas 6g in the gas reservoir 6 is driven by the negative pressure applied to the gas discharging portion 5b, and is discharged from the slit 6b towards the reaction cylinder 4. The cold gas 6g can be any gas so long as it can cool the metal oxide generated, and is preferably an inert gas, for example, air. The flow speed of the cold gas 6g is preferably two times or more of the flow speed of the burner gas 2a. The upper limit of the flow speed of the cold gas 6g is not particularly limited, and is 1000 times the flow speed of the burner gas 2a for example. The ratio of flow speed of cold gas 6g/flow speed of burner gas 2a is 2 to 1000 for example, and the ratio is particularly for example, 2, 5, 10, 15, 20, 25, 30, 35, 40, 45, 50, 100, 200, 500, or 1000, and can be in the range between the two values exemplified herein. Here, in the present embodiment, a negative pressure is applied to the gas discharging portion 5b to allow the cold gas 6g to flow, however, a positive pressure can be applied to the gas introducing portion 6a to allow the cold gas 6g to flow.

After the support fine particles 150 come out of the flame 7, the support fine particles 150 would be immediately cooled by the cold gas 6g, thereby allowing to maintain the structure having the chained portion. The support fine particles 150 after cooling would be trapped by the filter 5a and collected. The trapped support fine particles 150 can be subjected to heat treatment at 400 to 1000° C. to adjust the crystallite diameter.

In the present invention, the support powder which is an aggregate of the support fine particles 150 can be manufactured by using the manufacturing apparatus 1. Here, a high-temperature region of 1000° C. or higher is formed at the tip of the burner 2 by the flame 7, and the titanium compound and the tin compound are allowed to undergo a thermal decomposition reaction in this high-temperature region while supplying the cold gas 6g through the slit 6b to the surroundings of the high-temperature region. The high-temperature region can be formed by plasma instead of the flame 7.

4. Method for Manufacturing Support and Metal Catalyst 100

The method for manufacturing support and metal catalyst 100 comprises a supporting step and a reduction step.

<Supporting Step>

In the supporting step, the metal fine particles 130 are supported on the support powder. Such supporting can be performed by a reverse micelle method, a colloidal method, an impregnation method and the like. The supporting step of the colloidal method comprises an adsorbing step and a heat treatment step.

In the adsorbing step, the metal colloidal particles are adsorbed onto the support powder. More particularly, the metal colloidal particles synthesized by the colloidal method is dispersed in an aqueous solution to prepare a dispersion, and then the metal colloidal particles are added and mixed in the dispersion. Accordingly, the colloidal particles are adsorbed onto the surface of the support powder. The support powder having the colloidal particles adsorbed thereon is then filtered and dried, thereby being separated from the dispersion medium. The metal of the metal colloidal particles include platinum.

In the heat treatment step, heat treatment is performed at 100 to 400° C. after the adsorbing step to convert the metal colloidal particles into metal fine particles 130. The temperature of the heat treatment is, particularly for example, 100, 150, 200, 250, 300, 350, or 400° C., and can be in the range between the two values exemplified herein.

The heat treatment duration time is, for example, 0.1 to 20 hours, preferably 0.5 to 5 hours. The heat treatment duration time is, particularly for example, 0.1, 0.5, 1, 2, 3, 4, 5, 6, 7, 8, 9, 10, 15, or 20 hours, and can be in the range between the two values exemplified herein.

Heat treatment can be carried out under an inert gas atmosphere such as nitrogen, or under an inert gas atmosphere containing 1 to 4% of hydrogen.

<Reduction Step>

In the reduction step, reduction treatment of the metal fine particles 130 is carried out after the heat treatment step. The reduction treatment can be carried out by performing a heat treatment under a reductive atmosphere containing a reductive gas such as hydrogen.

The temperature of this heat treatment is, for example, 70 to 300° C., preferably 100 to 200° C. This temperature is, particularly for example, 70, 80, 90, 100, 110, 120, 130, 140, 150, 160, 170, 180, 190, 200, 250, or 300° C., and can be in the range between the two values exemplified herein.

The heat treatment duration time is, for example, 0.01 to 20 hours, preferably 0.1 to 5 hours. The heat treatment duration time is, particularly for example, 0.01, 0.05, 0.1, 0.5, 1, 2, 3, 4, 5, 6, 7, 8, 9, 10, 15, or 20 hours, and can be in the range between the two values exemplified herein.

When the reductive gas is hydrogen, the concentration thereof is, for example, 0.1 to 100 volume %, preferably 0.2 to 10 volume %, and more preferably 0.5 to 3 volume %. Thins concentration is, particularly for example, 0.1, 0.2, 0.5, 1, 1.5, 2, 2.5, 3, 10, or 100 volume %, and can be in the range between the two values exemplified herein.

The metal fine particles 130 after the heat treatment in the supporting step can be in an oxidized condition. In such case, the metal fine particles 130 may not show catalyst activity. The catalyst activity can be increased by reducing the metal fine particles 130.

EXAMPLES

The support and metal catalyst was manufactured in accordance with the method described below, and various evaluations were performed.
1. Manufacture of Support and Metal Catalyst 100

Example 1

Figure 12:
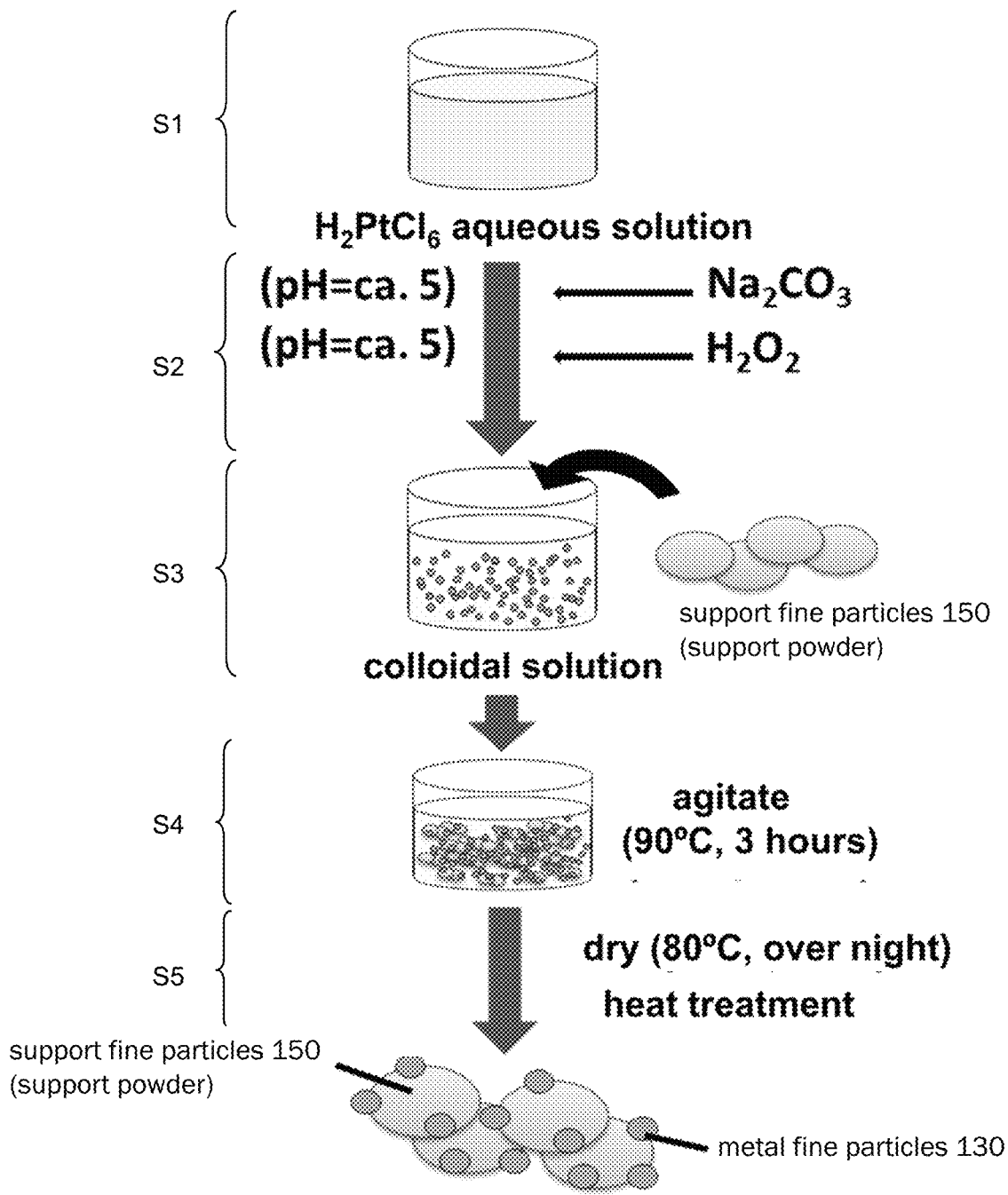
FIG. 12 shows a flow of the supporting and reduction step of the metal fine particles 130.

(Manufacture of Support Powder)
By using the manufacturing apparatus 1 shown in FIG. 8 to FIG. 11, support powder was manufactured. As the burner gas 2a, gas prepared by blending 5 L/min of oxygen and 1 L/min of propane gas was used. This gas was ignited to form a flame (chemical flame) 7 of 1600° C. or higher at the tip of the burner 2. The raw material solution 23a was prepared by blending titanium octylate, tin octylate, and tantalum octylate by a molar ratio of 0.40:0.60:0.10, and then the blend was further combined with mineral spirit terpen and dissolved. Oxygen was used as the mist gas 13a. 9 L/min of the mist gas 13a and 3 g/min of the raw material solution 23a The solution was diluted with 150 ml of water, and pH of the solution was adjusted to 5 with NaOH. Thereafter, 25 ml of hydrogen peroxide was added, and the pH was again adjusted to 5 with NaOH (Step S2 of FIG. 12).
To the dispersion, a dispersion prepared by dispersing 0.50 g of support powder in 15 mL of super pure water was added (Step S3 of FIG. 12), and the mixture was agitated for 3 hours at 90° C. (Step S4 of FIG. 12). The mixture was cooled to room temperature, and was then filtered. The residue was washed with super pure water and alcohol, and was then dried overnight at 80° C. The residue was then subjected to heat treatment at 400° C. for 2 hours under nitrogen atmosphere to support the metal fine particles 130 onto the support powder. Subsequently, heat treatment at 150° C. for 2 hours under 1% hydrogen atmosphere was performed to reduce the metal fine particles 130 (Step S5 of FIG. 12). Accordingly, support and metal catalyst 100 as metal fine particles 130 supported on support powder was obtained.

Examples 2 to 5 and Comparative Examples 1 to 4

Support and metal catalyst 100 were manufactured in a similar manner as Example 1, except for altering the molar ratio of titanium octylate, tin octylate, and tantalum octylate as shown in Table 1.

TABLE 1

|  | Examples | | | | | Comparative Examples | | | |
| --- | --- | --- | --- | --- | --- | --- | --- | --- | --- |
|  | 1 | 2 | 3 | 4 | 5 | 1 | 2 | 3 | 4 |
| titanium octylate | 0.4 | 0.5 | 0.6 | 0.7 | 0.8 | 0 | 0.2 | 0.9 | 1 |
| tin octylate | 0.6 | 0.5 | 0.4 | 0.3 | 0.2 | 1 | 0.8 | 0.1 | 0 |
| tantalum octylate | 0.1 | 0.1 | 0.1 | 0.1 | 0.1 | 0.1 | 0.1 | 0.1 | 0.1 |
| atom ratio of Ti/(Ti + Sn) | 0.4 | 0.5 | 0.6 | 0.7 | 0.8 | 0.0 | 0.2 | 0.9 | 1.0 |
| electric conductivity (S/cm) support powder | 7.56E−07 | 1.95E−06 | 1.35E−06 | 1.68E−06 | 2.41E−05 | 6.83E−07 | 1.83E−06 | 2.21E−06 | 1.71E−06 |
| support and metal catalyst | 4.49E−02 | 1.44E−02 | 4.13E−02 | 3.60E−02 | 2.49E−02 | 1.00E−02 | 3.93E−03 | 1.25E−05 | 3.20E−07 | were blended and sprayed from the tip of the raw material supplying unit 3 which is a spray nozzle (atomizer) towards the center portion of the flame, thereby allowing combustion of the blend and generation of the support powder which is an aggregate of the support fine particles 150. During such, negative pressure was applied to the gas discharging portion 5b to suction air from slit 6b at a flow rate of 170 L/min, thereby collecting the generated support powder in the collector 5 (with filter 5a). The raw material supplying unit 3 comprises a double tube structure (overall length of 322.3 mm). Oxygen is supplied from the outer cylinder 13, and the raw material solution 23a is supplied to the raw material distribution cylinder 23. At the tip of the raw material distribution cylinder 23, a fluid nozzle and an air nozzle are provided, and the raw material solution 23a was converted into the mist 23b at this position. The amount of the support powder collected was 10 g or more when the operation was carried out for 60 minutes.
(Support and Reduction of Metal Fine Particles (Pt) 130)
In accordance with the procedures shown in FIG. 12, metal fine particles 130 were supported onto the support powder.
First, 0.57 mL of chloroplatinic acid hexahydrate aqueous solution was dissolved in 38 ml of super pure water, followed by addition of 1.76 g of sodium carbonate, and then the mixture was agitated (Step S1 of FIG. 12).

Figure 13:
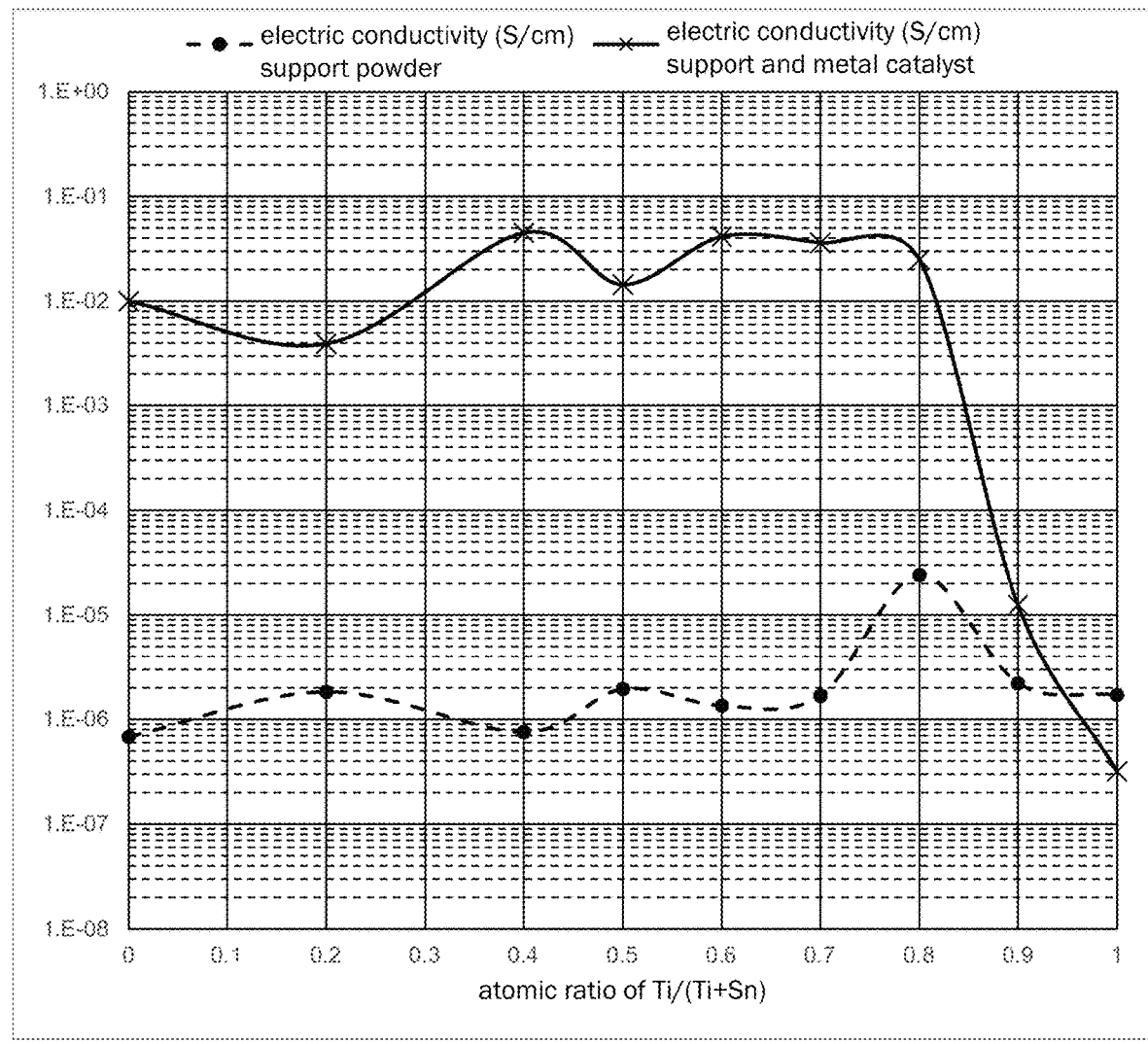
FIG. 13 shows a graph of the measurement results of electric conductivity.

2. Measurement of Electric Conductivity
With the Examples and Comparative Examples, electric conductivity of the support powder before supporting the metal fine particles 130 and electric conductivity of the support and metal catalyst 100 after supporting the metal fine particles 130 were measured. Results are shown in Table 1 and FIG. 13.
As shown in Table 1 and FIG. 13, the support and metal catalyst 100 according to the Examples had higher electric conductivity compared with the support and metal catalyst 100 according to the Comparative Examples. In addition, the atom ratio of Ti/((Ti+Sn) had greater influence on the electric conductivity in the support and metal catalyst 100, compared with the support powder.
The method for measuring the electric conductivity is as follows.
Support and metal catalyst or support powder were weighed precisely by the same weight using a precise electronic balance to prepare 8 samples (hereinafter referred to as "target sample"). The 8 samples were each filled into 8 sample holders (3 mm diameter, 5 mm depth) in the measurement tool, respectively. The measurement tool filled with the target samples was set in a pressure device, and the target samples were compressed with a force of 1.1 kN. By using the electrode provided with the compression tool of the pressure device, the resistance of the target sample during compression was measured by the DC two-terminal method, and the length of the target sample was also measured at the same time. These procedures were performed with 4 or more kinds of target samples with different weight. The relation between the length of the target sample (x axis) and resistance (y axis) during compression was obtained, and extrapolation towards the y axis was performed to obtain the y intercept. The specific resistance of the target sample was obtained from the value of the y intercept, length and cross-sectional area of the compressed powder. The electric conductivity was calculated as the inverse of the specific resistance.

EXPLANATION OF SYMBOLS

1: manufacturing apparatus, 2: burner, 2a: burner gas, 3: raw material supplying unit, 4: reaction cylinder, 5: collector, 5a: filter, 5b: gas discharging portion, 6: gas reservoir, 6a: cold gas introducing portion, 6b: slit, 6c: inner peripheral wall, 6d: burner insertion hole, 6g: cold gas, 7: flame, 13: outer cylinder, 13a: mist gas, 20: fuel cell, 23: raw material distribution cylinder, 23a: raw material solution, 23b: mist, 100: support and metal catalyst, 110: void, 120: crystallite, 130: metal fine particles, 150: support fine particles, 160: branch, 200: fuel cell, 201: anode, 202: cathode, 203: load, 210A: gas diffusion layer on anode side, 210K: gas diffusion layer on cathode side, 220A: catalyst layer on anode side, 220K: catalyst layer on cathode side

The invention claimed is:

1. A support and metal catalyst, comprising:
a support powder; and
metal fine particles supported on the support powder; wherein:
the support powder is an aggregate of support fine particles;
the support fine particles have a chained portion structured by a plurality of crystallites being fusion bonded to form a chain;
the support fine particles are structured with metal oxide; and
the metal oxide comprises titanium and tin at an atomic ratio of titanium with respect to total of titanium and tin of 0.30 to 0.80;
the metal oxide is doped with a dopant element having a different valence than the titanium and tin.

2. The support and metal catalyst of claim 1, wherein the atomic ratio of titanium with respect to total of titanium and tin is 0.40 to 0.80.

3. The support and metal catalyst of claim 1, wherein the dopant element is tantalum, niobium, antimony or tungsten.

4. The support and metal catalyst of claim 3, wherein the atomic ratio of the dopant element with respect to total metal contained in the metal oxide is 0.05 to 0.30.

5. The support and metal catalyst of claim 1, wherein the metal fine particles contain platinum.

6. An electrochemical cell comprising the support and metal catalyst of claim 5.

7. The support and metal catalyst of claim 1, wherein the atomic ratio of titanium with respect to total of titanium and tin is 0.35 to 0.45.

8. The support and metal catalyst of claim 1, wherein a mean particle size of the metal fine particles is 3 to 10 nm.

* * * * *